United States Patent Office 2,786,018
Patented Mar. 19, 1957

2,786,018

STABILIZATION OF CRACKED GASOLINES

Harold Beuther, Penn Township, Allegheny County, and William C. Offutt, Mount Lebanon Township, Allegheny County, Pa., assignors to Gulf Research & Development Company, Pittsburgh, Pa., a corporation of Delaware No Drawing. Application May 5, 1954, Serial No. 427,858

3 Claims. (Cl. 196—40)

This invention relates to a process for treating hydrocarbons and more particularly to a process for improving the stability of cracked gasolines.

Gasolines prepared by either thermal or catalytic cracking of hydrocarbon oils are unstable, as indicated by the formation of gum when the gasoline is stored for long periods. The gum is objectionable in causing deposits which impair the operation of internal combustion engines. Gum formation in gasoline is probably caused by several reactions taking place during the storage period. It has been suggested that the formation of gum is accelerated by the presence of compounds containing elements in addition to carbon and hydrogen, and particularly oxygen- or sulfur-containing compounds, in the gasoline. It is probable that at least a part of the gum is caused by the polymerization of olefinic, diolefinic or other unsaturated hydrocarbons. The gum forming compounds are usually concentrated in the heavy fractions of the gasoline. Undercutting of cracked gasolines to reduce the amount of heavy fractions present will cause a marked improvement in the stability of the gasoline, but, of course, also results in a decreased yield of gasoline.

The reagent which is probably most widely used in treating cracked gasolines to improve its stability is concentrated sulfuric acid. Sulfuric acid is a cheap, effective treating agent but it has several important disadvantages. Substantial amounts of sulfuric acid, of the order of 10 or more pounds per barrel of gasoline (3.6 percent by weight), are used in the treating process with the resultant formation of substantial amounts of sludge. The disposal of the acid sludge is usually difficult. Moreover, the use of acid treating introduces corrosion problems, for example, in distillation equipment.

According to this invention, cracked gasolines are contacted with boron trifluoride promoted with fluosulfonic acid to improve the stability of the gasoline.

The cracked gasoline to be treated is mixed with boron trifluoride and the fluosulfonic acid in any batch or continuous reactor equipped with suitable mixing apparatus, such as mechanical agitators or orifice type mixers, to provide thorough contact of the gasoline with the promoted boron trifluoride. The boron trifluoride and fluosulfonic acid may be added directly to the gasoline to be treated in separate streams or may be mixed together and then added to the cracked gasoline. Either or both of the boron trifluoride and fluosulfonic acid can be added to the cracked gasoline in the reactor or prior to charging to the reactor, as long as effective concentrations of both promoter and boron trifluoride are in contact with the gasoline simultaneously during the treatment.

The stabilization reaction proceeds rapidly to substantial completion. No difference in the results of treating were determined in experimental runs, even though the period of mixing the promoted boron trifluoride with the gasoline was varied from one to ten minutes. The treating reaction is not sensitive to temperature; hence, it is preferably performed at substantially atmospheric temperature or at the temperature of the gasoline available for treatment in order to avoid the expense of heating or cooling the gasoline. Experimental work has indicated that varying the temperature of the reactor from room temperature to 300° F. will cause little change in the properties of the treated gasoline.

The amount of boron trifluoride employed in the treatment will vary with the type of gasoline being treated. In general, heavy fluid catalytically cracked gasolines are more difficult to stabilize than heavy thermal gasolines and will require larger quantities of boron trifluoride. Gasolines from fixed bed and moving bed catalytic cracking processes usually fall between the fluid catalytic gasoline and the thermal gasoline in respect to the difficulty in stabilization. The type of charge stock, in addition to the type of cracking operation, will influence the amount of boron trifluoride and promoter required. The amount of boron trifluoride will also depend upon the degree of stabilization desired. In general, approximately 0.05 percent (by weight of the charge) boron trifluoride promoted with approximately 0.05 percent (by weight of the charge) fluosulfonic acid is preferred in the stabilization of heavy fluid catalytically cracked gasolines and approximately one-half of those concentrations for example, 0.03 percent $BF_3$ and 0.03 percent $HSO_3F$, is sufficient for the stabilization of thermally cracked gasoline. The minimum amounts of promoter and boron trifluoride for the treatment of catalytically cracked gasoline may be as low as approximately one-half the preferred quantities set forth above.

The amount of fluosulfonic acid required for the promotion of the boron trifluoride will depend in part upon the amount of boron trifluoride used in the treatment. In general, the larger the amount of boron trifluoride employed, the smaller the quantity of promoter required since the promoting effect required to obtain the desired degree of stabilization is reduced; however, the amount of promoter should be at least about 0.03 percent by weight of the charge to obtain an appreciable promoting effect. The low cost of fluosulfonic acid as compared with boron trifluoride makes it desirable to use quantities of fluosulfonic acid sufficient to give a marked promoting effect to the boron trifluoride. Fluosulfonic acid in amounts of at least 0.03 percent by weight of the gasoline, and more desirably 0.05 percent, can be employed. In general, little is gained by the use of larger amounts of fluosulfonic acid since the action of those compounds is as a promoter rather than as a treating agent, per se.

After the mixing of the promoted boron trifluoride for a period sufficient to obtain substantial completion of the reactions taking place in the reactor, the treated gasoline is allowed to settle, either in the reactor or a separate vessel, and the treated gasoline decanted from the residue which readily settles. Since heavy materials formed in the reactor are of at least limited solubility in the gasoline, a complete separation of the gasoline and such products cannot be made by decantation, and further separation is desirable. Conventional separation processes may be employed. For example, the treated gasoline can be washed with water to remove dissolved boron trifluoride, neutralized with caustic, and redistilled to the desired end point. The thus treated and rerun gasoline can be handled in any desired manner, and is usually blended with other stocks to form a finished gasoline. In the preparation of commercial gasolines, a small amount of an inhibitor, ordinarily of the order of 10 pounds of inhibitor per 1000 barrels of gasoline is added to the gasoline to improve its storage characteristics. However, the process of this invention improves the storage characteristics of either inhibited or uninhibited gasolines.

The following examples illustrate the promotion effect of fluosulfonic acid on boron trifluoride in the stabilization of gasolines.

EXAMPLE 1

A heavy fluid catalytically cracked gasoline having a gravity of 43.7° A. P. I. and a distillation range from 250° F. over point to 378° F. for the 90 percent point was pumped into a continuous, mechanically agitated reactor. Boron trifluoride was added directly to the reactor from a container through a line containing a meter and valve to maintain a constant rate of flow of the boron trifluoride at 0.05 percent by weight of charge. The amount of boron trifluoride added during the entire run was determined by weighing the boron trifluoride container before and after the run. The gasoline and treating agent were mixed in the reactor which was maintained at substantially room temperature. The rates of flow were adjusted to give a time in the reactor of about 10 minutes. The effluent from the reactor was delivered into a settling vessel in which a residue readily separated. After separation of the residue, the gasoline was bubbled through a water scrubber to remove dissolved boron trifluoride. The treated gasoline was then re-distilled to a cut point of 420° F. vapor temperature in a batch still to remove soluble polymers. Decomposition of the gasoline during the distillation was avoided by limiting the temperature in the bottom of the still to 300° F. and reducing the pressure on the still in order to obtain higher temperatures, corrected to 760 millimeters of mercury.

EXAMPLE 2

A sample of the same gasoline employed as charge stock in Example 1 was treated by the same process as described in Example 1 with the exception that the rate of addition of boron trifluoride was 0.10 percent by weight of charge.

EXAMPLE 3

A sample of the heavy fluid catalytically cracked gasoline employed as charge stock in Example 1 was treated by the addition of fluosulfonic acid into the gasoline charged to the reactor at the rate of 0.09 percent, by weight, of the gasoline. The mixture was agitated for approximately ten minutes, settled, and the gasoline separated from the residue. The treated gasoline was washed with water, neutralized with caustic, and re-distilled to a cut point of 420° F., vapor temperature.

EXAMPLE 4

A sample of the heavy fluid catalytically cracked gasoline employed as charge stock in the other examples was treated by the addition of fluosulfonic acid into the gasoline charged to the reactor at the rate of 0.05 percent, by weight, of the gasoline. Boron trifluoride was added to the gasoline in the reactor at the rate of 0.04 percent, by weight, of gasoline. The mixture was treated according to the process described in Example 3.

The rerun gasoline from each of Examples 1 through 4 was inhibited by the addition of duPont No. 5 Antioxidant (a mixture containing 50 percent n-butyl-p-aminophenol, 20 percent methanol and 30 percent isopropanol) at the rate of 10 pounds (of active ingredient) per 1000 barrels of gasoline. A sample of the charge stock was re-distilled to 420° F. cut point and inhibited in the same manner as the other samples. Each of the treated and inhibited gasolines, and the rerun charge stock, was tested by several standard accelerated stability tests. The results of the tests are presented in Table I.

*Table I*

| Example | | 1 | 2 | 3 | 4 |
|---|---|---|---|---|---|
| Type of Operation | Rerun Charge | BF₃ | BF₃ | HSO₃F | BF₃ and HSO₃F |
| BF₃ Rate, Percent by Weight of Charge | | 0.05 | 0.10 | | 0.04 |
| Fluosulfonic Acid Rate, Percent by Weight of Charge | | | | 0.09 | 0.05 |
| Yield of Treated Gasoline, Percent by Vol. of Charge (Rerun to 420° F.) | 94.9 | 95.3 | 94.8 | 94.1 | 93.9 |
| Inspections of Treated and Rerun Gasoline (Inhibited): | | | | | |
| Copper Dish Gum, Mg./100 Ml. (ASTM D 940–51T) | 130 | 76 | 47 | 118 | 63 |
| Existent Gum, Mg./100 Ml. (ASTM D 381–50) | 9.5 | | 2.8 | 3.4 | 2.2 |
| Oxidation Stability, Min. (ASTM D 525–49) | 136 | 235 | 290 | 155 | 215 |
| GM Sludge No. | 132 | 91 | 73 | 91.4 | 76.4 |
| Time Required at which gum content is 10 Mg. Gum/100 Ml. at 150° F., hrs | 50 | | 125 | 107 | >255 |
| Time Required at which gum content is 10 Mg. Gum/100 Ml. at 100° F., days | 51 | 62 | 155 | 75 | >192 |

The major portion of the losses in yield are the result of losses during the re-distillation to a 420° F. cut point, as shown in Table I by the relatively low yield of rerun charge stock. Losses in yield resulting from treatment according to this invention are small compared to the handling losses in the re-distillation.

It will be noticed from Table I that the treatment of the heavy fluid catalytic cracked gasoline with 0.05 percent boron trifluoride results in a gasoline in which 10 milligrams of gum per 100 milliliters of gasoline are present after 62 days in storage at 100° F. A gasoline having those characteristics is usually not sufficiently stable for blending with other stocks to form finished gasolines. (The presence of 10 mg. of gum/100 ml. after 62 days storage at 100° F. corresponds to a similar gum content after storage for approximately 9 months at 80° F.) If the rate of addition of the boron trifluoride is increased to 0.1 percent by weight of charge, as in Example 2, the time after which 10 milligrams of gum per 100 milliliters of gasoline are present in the gasoline stored at 100° F. is increased to 155 days. There are also corresponding improvements in the copper dish gum, existent gum, oxidation stability and GM sludge number. Ordinarily, a gasoline having the properties of the gasoline produced in Example 2 is suitable for blending with lighter fractions.

If the gasoline is treated with boron trifluoride promoted with fluosulfonic acid, as in Example 4, the addition of boron trifluoride and fluosulfonic acid in amounts of 0.04 and 0.05 percent, respectively, by weight of the gasoline increases the time after which 10 milligrams of gum in 100 milliliters of gasoline are present in the gasoline to more than 192 days, when the gasoline is stored at 100° F. A comparison of the gum-time characteristics of the gasoline treated with boron trifluoride alone, fluosulfonic acid alone and boron trifluoride promoted with fluosulfonic acid shows that the fluosulfonic acid exerts a strong and wholly unexpected promoting effect on boron trifluoride as a treating reagent. Thus, it is possible to substitute fluosulfonic acid for some of the much more expensive boron trifluoride and actually obtain an improved treating reagent.

This invention has been described in detail for the stabilization of heavy fluid catalytically cracked gasolines because those gasolines are usually the most unstable and difficult to stabilize gasolines. Other cracked gasolines, such as thermally cracked gasolines, gasolines cracked by other catalytic processes, or lighter fractions of such gasolines can also be stabilized by treatment according to this invention.

We claim:

1. A process for the stabilization of cracked gasoline comprising contacting the gasoline with boron trifluoride promoted with fluosulfonic acid, the amount of fluosulfonic acid being about 0.05%, by weight, of the gasoline, and separating the gasoline from the residue formed during the contacting.

2. A process for the stabilization of cracked gasoline comprising contacting the gasoline with boron trifluoride promoted with fluosulfonic acid, the amount of each of the boron trifluoride and the fluosulfonic acid being about 0.05%, by weight, of the gasoline, and separating the gasoline from the residue formed during the contacting.

3. A process for the stabilization of cracked gasoline comprising contacting the gasoline with boron trifluoride promoted with fluosulfonic acid, the amount of fluosulfonic acid being about 0.05%, by weight, of the gasoline, separating the gasoline from the residue formed in the contacting step, washing the separated gasoline with water, distilling the washed gasoline, and collecting the gasoline as a distillate product.

References Cited in the file of this patent

UNITED STATES PATENTS

| | | |
|---|---|---|
| 1,966,010 | Howes | July 10, 1934 |
| 1,992,308 | Hultman | Feb. 26, 1935 |
| 2,133,452 | Hewlett | Oct. 18, 1938 |
| 2,190,471 | Ellis | Feb. 13, 1940 |
| 2,459,419 | Engel et al. | Jan. 18, 1949 |